US012785210B2

(12) United States Patent
Yoon et al.

(10) Patent No.: US 12,785,210 B2
(45) Date of Patent: Nov. 3, 2026

(54) BATTERY PACK AND VEHICLE INCLUDING THE SAME

(71) Applicants: HYUNDAI MOTOR COMPANY, Seoul (KR); Kia Corporation, Seoul (KR)

(72) Inventors: Seok Eun Yoon, Seoul (KR); Young Hoo Oh, Daejeon (KR); Yu Ri Oh, Hwaseong-si (KR); In Gook Son, Incheon (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 39 days.

(21) Appl. No.: 18/926,006

(22) Filed: Oct. 24, 2024

(65) Prior Publication Data

US 2025/0202035 A1 Jun. 19, 2025

(30) Foreign Application Priority Data

Dec. 13, 2023 (KR) ........................ 10-2023-0181252

(51) Int. Cl.
*H01M 50/358* (2021.01)
*B60L 50/60* (2019.01)
(Continued)

(52) U.S. Cl.
CPC ........... *H01M 50/358* (2021.01); *B60L 50/64* (2019.02); *B60L 50/66* (2019.02); *H01M 50/204* (2021.01); *H01M 50/249* (2021.01); *H01M 50/258* (2021.01); *H01M 50/262* (2021.01); *H01M 50/271* (2021.01); *H01M 50/3425* (2021.01); *H01M 50/367* (2021.01); *B60R 5/04* (2013.01); *H01M 2200/20* (2013.01); *H01M 2220/20* (2013.01)

(58) Field of Classification Search
CPC ............. H01M 50/249; H01M 50/258; H01M 50/256; H01M 50/204
See application file for complete search history.

(56) References Cited

U.S. PATENT DOCUMENTS 7,688,582 B2 3/2010 Fukazu et al.
8,528,482 B2 9/2013 Wang et al.
(Continued)

FOREIGN PATENT DOCUMENTS

CN 208622899 U 3/2019
JP 2012-530640 A 12/2012
(Continued)

*Primary Examiner* — Haroon S. Sheikh
(74) *Attorney, Agent, or Firm* — Morgan, Lewis & Bockius LLP

(57) ABSTRACT

A battery pack includes a plurality of battery modules extending in a first direction and disposed in a second direction crossing the first direction, a battery pack housing accommodating the battery modules, configured to vent fluid to an outside, and including a venting passage extending along a circumferential portion thereof, and a guide duct coupled to the battery pack housing to define a guide passage fluidically-communicating with the venting passage in an interior thereof, and including an opening portion configured to fluidically-communicate the guide passage and the outside when a specific pressure is reached.

18 Claims, 9 Drawing Sheets

(51) Int. Cl.

| | |
|---|---|
| ***B60L 50/64*** | (2019.01) |
| ***B60R 5/04*** | (2006.01) |
| ***H01M 50/204*** | (2021.01) |
| ***H01M 50/249*** | (2021.01) |
| ***H01M 50/258*** | (2021.01) |
| ***H01M 50/262*** | (2021.01) |
| ***H01M 50/271*** | (2021.01) |
| ***H01M 50/342*** | (2021.01) |
| ***H01M 50/367*** | (2021.01) |

(56) References Cited

U.S. PATENT DOCUMENTS

| | | | | |
|---|---|---|---|---|
| 9,742,043 | B2 | 8/2017 | Tanigaki et al. | |
| 10,388,923 | B2 | 8/2019 | Takahashi et al. | |
| 2010/0009244 | A1* | 1/2010 | Murata | H01M 10/613 429/53 |
| 2012/0145030 | A1 | 6/2012 | Wang et al. | |
| 2013/0330587 | A1* | 12/2013 | Takahashi | H01M 50/289 429/99 |
| 2014/0342202 | A1 | 11/2014 | Chang | |
| 2015/0010795 | A1 | 1/2015 | Tanigaki et al. | |
| 2020/0235359 | A1* | 7/2020 | Hayashi | H01M 50/358 |
| 2022/0052413 | A1* | 2/2022 | Haussmann | B60L 3/0007 |
| 2022/0393298 | A1* | 12/2022 | Shin | H01M 50/209 |
| 2022/0407170 | A1* | 12/2022 | Shin | H01M 50/35 |
| 2023/0080035 | A1* | 3/2023 | Jeon | H01M 50/291 429/163 |
| 2023/0082883 | A1* | 3/2023 | Pak | H01M 50/519 320/122 |
| 2023/0129184 | A1* | 4/2023 | Sakamoto | H01M 10/625 429/53 |
| 2023/0173901 | A1* | 6/2023 | Kuo | H01M 50/317 |
| 2023/0231264 | A1* | 7/2023 | Jeon | H01M 50/383 429/87 |
| 2023/0282928 | A1* | 9/2023 | Lee | H01M 50/383 429/57 |
| 2024/0063501 | A1* | 2/2024 | Ahn | H01M 50/209 |
| 2024/0204346 | A1* | 6/2024 | Jang | H01M 10/6567 |
| 2024/0347851 | A1* | 10/2024 | Son | H01M 50/383 |
| 2024/0405354 | A1* | 12/2024 | Oh | H01M 50/383 |
| 2024/0413480 | A1* | 12/2024 | Lee | H01M 50/367 |
| 2025/0096407 | A1* | 3/2025 | Lee | H01M 50/317 |
| 2025/0202038 | A1* | 6/2025 | Kim | H01M 50/30 |

FOREIGN PATENT DOCUMENTS

| | | | |
|---|---|---|---|
| JP | 2013-171662 | A | 9/2013 |
| JP | 5734309 | B2 | 6/2015 |
| KR | 10-2013-0068984 | A | 6/2013 |
| KR | 10-2021-0082086 | A | 7/2021 |

* cited by examiner

BATTERY PACK AND VEHICLE INCLUDING THE SAME

CROSS-REFERENCE TO RELATED APPLICATION

The present application claims priority to Korean Patent Application No. 10-2023-0181252, filed on Dec. 13, 2023, the entire contents of which is incorporated herein for all purposes by this reference.

BACKGROUND OF THE PRESENT DISCLOSURE

Field of the Present Disclosure

The present disclosure relates to a battery pack, and a vehicle including the same.

Description of Related Art

Recently, as awareness of the crisis over the environment and depletion of oil resources has increased, research and development on electric vehicles that are eco-friendly vehicles has been highlighted. Electric vehicles (hereinafter referred to as "vehicles") include plug-in hybrid electric vehicles (PHEVs), battery electric vehicles (BEVs), and fuel cell electric vehicles (FCEVs).

A vehicle may include a battery pack having a battery module and a battery pack housing that covers the battery module. Meanwhile, the vehicle may include a first battery pack, and a second battery pack which is provided separately from the first battery pack and is used in situations, in which the first battery pack is not operated.

Both of the first battery pack and the second battery pack use battery cells as power sources, and when a fire occurs in the battery module of the second battery pack as well as the first battery pack, there is a risk of thermal runaway occurring in the second battery pack.

Accordingly, there has recently been a growing need for vehicles provided with a second battery pack which may reduce thermal runaway and heat transfer when a fire occurs in the battery module of the second battery pack.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a battery pack which may vent fluid generated in an interior of a second battery pack to an outside, and a vehicle including the same.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a battery pack includes a plurality of battery modules extending in a first direction and disposed in a second direction crossing the first direction, a battery pack housing accommodating the battery modules, configured to vent fluid to an outside of the battery pack housing, and including a venting passage extending along a circumferential portion of the battery pack housing, and a guide duct coupled to the battery pack housing to define a guide passage fluidically-communicating with the venting passage in an interior thereof, and including an opening portion configured to fluidically-communicate the guide passage and the outside in response that a predetermined pressure is reached in the guide passage.

The venting passage may include a first venting passage extending in the second direction, and a second venting passage fluidically-communicating with the first venting passage and extending in the first direction, and the battery pack housing may include a base plate supporting the battery modules, and a first support member supported by the base plate, extending in the second direction from a side of the battery module in the first direction or an opposite direction to the first direction, and including the first venting passage in an interior of the first support member.

The first support member may include a communication hole fluidically-communicating with the first venting passage in an area facing the battery modules.

The battery pack housing may further include a first side member disposed on an outside of the first support member to be parallel to the first support member, and a second side member extending in a direction crossing the first side member to cover a side of the battery modules in the second direction or an opposite direction to the second direction, and the second side member may include the second venting passage in an interior of the second side member.

The second side member may include a support portion including the second venting passage in an interior of the support portion, and a flange portion extending from the support portion to an outside of the battery pack housing and configured so that a coupling member is inserted into the flange portion.

The guide duct may be coupled to the second side member on one side of the flange portion.

The guide duct may extend from the battery pack housing in a direction being more distant from the battery modules.

The battery pack housing may further include a second support member extending a direction crossing the first support member, and including a through-hole, through which a coupling member passes, on an area overlapping the guide duct in the first direction.

Each of the battery modules may include battery cells, a module housing that covers the battery cells, disposed on a side of the battery cells in the first direction or the opposite direction to the first direction, and including a venting frame including a venting hole fluidically-communicating with the communication hole, and a side cover disposed between the venting frame and the battery cells, and including a perforated portion formed along a periphery of an area facing the venting hole or a notch portion formed to have a thickness being smaller than a thickness of a peripheral area thereof.

The first support members may include a support external wall that faces the first side member and a support internal wall that faces the battery modules. The support internal wall may include the communication hole which is fluidically-communicating with the first venting passage in an area that faces the battery modules and the communication hole may be disposed to face a separation area of a side cover covering the battery modules and the separation area of the side cover may be separated from the side cover in response that the predetermined pressure is reached in the guide passage.

The battery pack may further include a pack cover coupled to the first side member and the second side member to cover an upper side of the battery modules, and a fire-resistant cover disposed on an inside of the pack cover.

According to another aspect of the present disclosure, a vehicle includes a vehicle body frame defining a pack accommodating portion provided in a rear portion of the vehicle, and defining an outlet formed on one side of the pack accommodating portion in a leftward and rightward direction thereof, and a battery pack mounted in the pack accommodating portion, and the battery pack may include a battery pack housing coupled to the vehicle body frame, and defining a venting passage extending along a circumferential portion of the battery pack housing, a battery module accommodated in an interior of the battery pack housing, and a guide duct coupled to one side of the battery pack housing, including a guide passage fluidically-communicating the venting passage and the outlet, and including an opening portion configured to fluidically-communicate the guide passage and an outside of the battery pack housing in response that a predetermined pressure is reached in the guide passage.

The battery module may extend in a first direction, and may be disposed in a second direction crossing the first direction, and the venting passage may include a first venting passage extending in the second direction, and a second venting passage fluidically-communicating with the first venting passage and extending in the first direction, and the battery pack housing may include a base plate, and a first support member supported by the base plate, covering a side of the battery module in the first direction, and including the first venting passage in an interior of the first support member.

The battery pack housing may further include a first side member disposed on an outside of the first support member to be parallel to the first support member, and a second side member extending in a direction crossing the first side member to cove a side of the battery module in the second direction or an opposite direction to the second direction, and including the second venting passage in an interior of the second side member.

The second side member may include a support portion defining the second venting passage, and a flange portion protruding from the support portion to an outside of the battery pack housing, and coupled to the vehicle body frame, and the guide duct may be coupled to the second side member on a rear side of the flange portion.

The outlet may be disposed on a rear side of the second side member, and the guide duct may extend to a rear side of the vehicle from the second side member toward the outlet.

The battery pack housing may further include a second support member extending in a direction crossing the first support member, and including a through-hole, through which a coupling member passes, on an area overlapping the guide duct in the first direction.

The vehicle body frame may include a seat space provided on a front side of the pack accommodating portion, and a luggage space provided on a rear side or an upper side of the pack accommodating portion, and the outlet may be formed on one side of the luggage space.

The battery module may include battery cells and a module housing configured to cover the battery cells, disposed on a side of the battery cells in the first direction or an opposite direction to the first direction and including a venting frame including a venting frame including a venting hole fluidically-communicating with a communication hole. The first support member may include the communication hole fluidically-communicating with the first venting passage and including a separation area. The separation area of the side cover may be separated from the side cover in response that the predetermined pressure is reached in the guide passage.

The separation area of the side cover may include a perforated portion formed along a periphery of an area facing the venting hole or a notch portion formed to have a thickness being smaller than a thickness of a peripheral area thereof.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
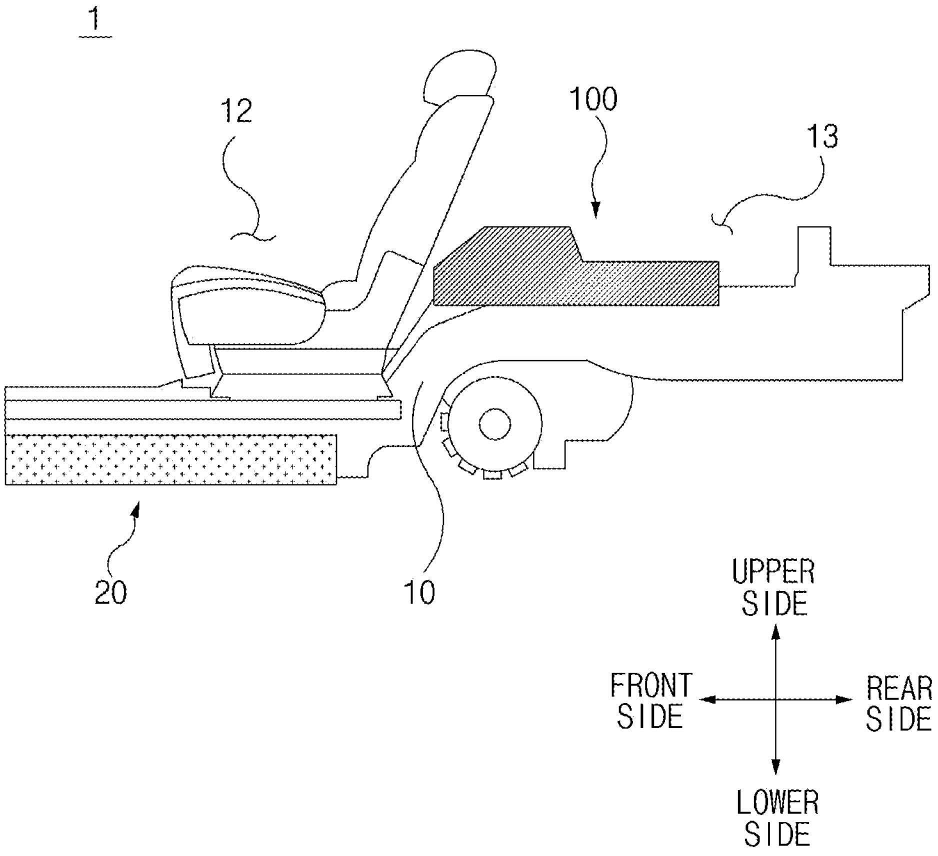
FIG. 1 is a schematic view of a vehicle, on which a first battery pack and a second battery pack are mounted, according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the appended drawings so that those skilled in the art may easily implement the present disclosure. When adding reference numerals to components in each drawing, it should be noted that identical components are provided the same reference numerals as much as possible even if they are shown in different drawings. Additionally, in describing embodiments of the present disclosure, when it is determined that detailed descriptions of related known configurations or functions may impede understanding of the exemplary embodiments of the present disclosure, detailed descriptions thereof will be omitted.

Furthermore, in describing the components of the exemplary embodiments of the present disclosure, terms, such as first, second, “A”, “B”, (a), and (b) may be used. The terms are simply for distinguishing the components, and the essence, the sequence, and the order of the corresponding components are not limited by the terms. Unless defined differently, all the terms including technical or scientific terms include the same meanings as those generally understood by an ordinary person in the art, to which the present disclosure pertains. The terms, such as the terms defined in dictionaries, which are generally used, should be construed to coincide with the context meanings of the related technologies, and are not construed as ideal or excessively formal meanings unless explicitly defined in an exemplary embodiment of the present disclosure.

Hereinafter, various exemplary embodiments of the present disclosure will be described in detail with reference to FIG. 1, FIG. 2, FIG. 3, FIG. 4, FIG. 5, FIG. 6, FIG. 7, FIG. 8 and FIG. 9.

Figure 2:
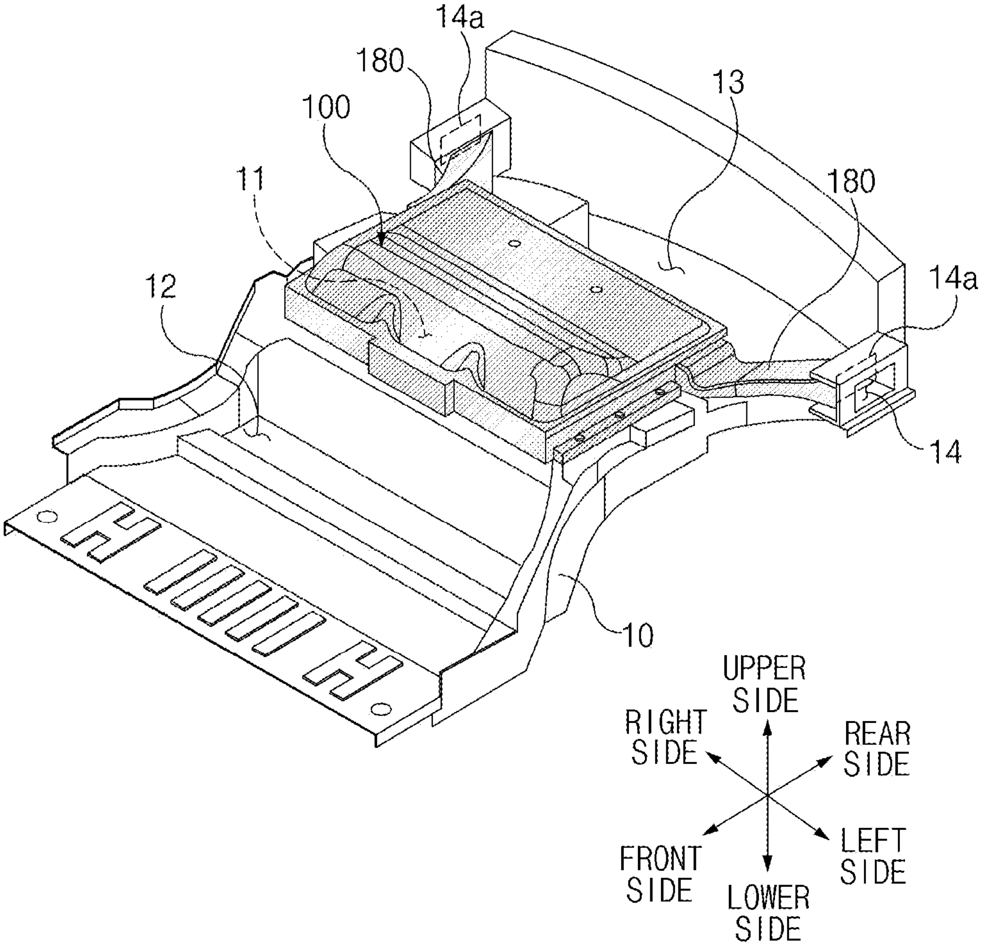
FIG. 2 is a schematic view of the rear portion of a vehicle, a second battery pack is mounted, according to an exemplary embodiment of the present disclosure.
Figure 3:
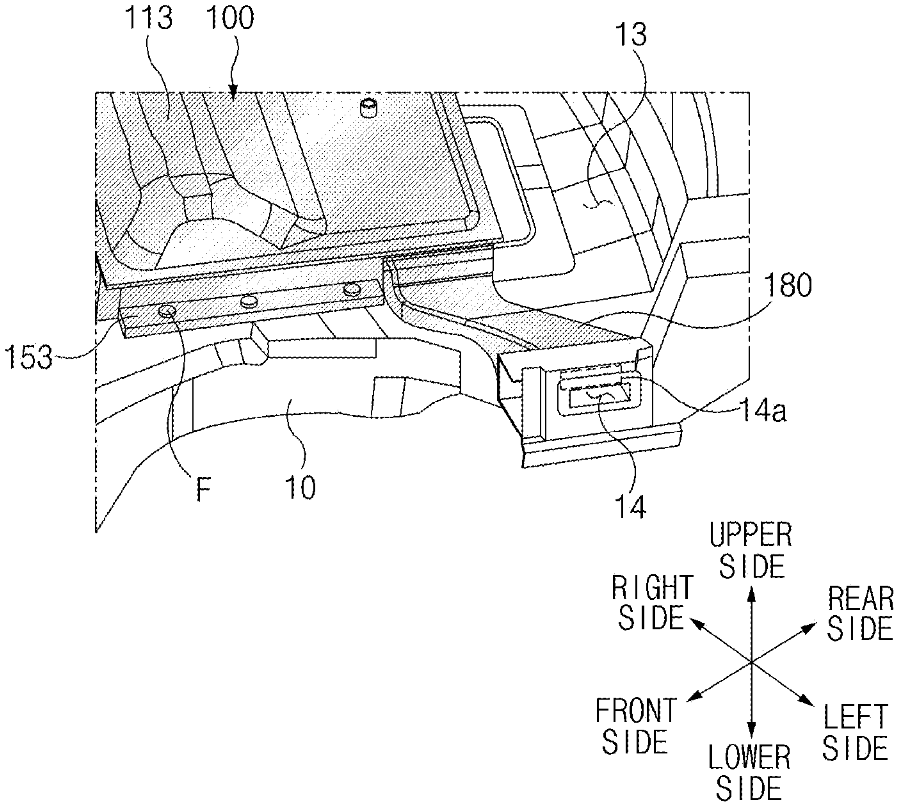
FIG. 3 is a schematic view of a vehicle body frame and a second battery pack including an outlet according to an exemplary embodiment of the present disclosure.

FIG. 1 is a schematic view of a vehicle, on which a first battery pack and a second battery pack are mounted, according to an exemplary embodiment of the present disclosure. FIG. 2 is a schematic view of the rear portion of the vehicle, the second battery pack is mounted, according to an exemplary embodiment of the present disclosure. FIG. 3 is a schematic view of the vehicle body frame and the second battery pack including an outlet according to an exemplary embodiment of the present disclosure.

Referring to FIG. 1, FIG. 2, and FIG. 3, a vehicle 1 may be an electric vehicle. The vehicle 1 may include a vehicle body frame 10 that defines a frame of the vehicle 1, a first battery pack 20 which is mounted on the vehicle body frame 10, and a second battery pack 100.

The first battery pack 20 may be used as a main battery pack that supplies an energy source to the vehicle 1 when the vehicle 1 is normally driven, and the second battery pack 100 may be used as an auxiliary battery pack that supplies an energy source to the vehicle 1 when the first battery pack 20 is not operated normally during discharge thereof.

The first battery pack 20 may be mounted in a substantially intermediate area in a forward/rearward direction of the vehicle 1, and the second battery pack 100 may be mounted in a rear area of the vehicle 1 in the forward/rearward direction thereof.

The vehicle body frame 10 may define a pack accommodating portion 11 which is provided in a rear portion of the vehicle 1, a seat space 12 which is provided on a front side of the pack accommodating portion 11, and a luggage space 13 which is provided on a rear side or an upper side of the pack accommodating portion 11.

The pack accommodating portion 11 may be a space, in which the second battery pack 100 is mounted. The seat space 12 may be a space, in which a seat, on which a user of the vehicle 1 is to be seated, is provided. The luggage space 13 may be a space which is provided on a rear side of the seat space 12 to accommodate items or the like.

The first battery pack 20 may be disposed on a lower side of the seat space 12 and may be fixed to the vehicle body frame 10, and the second battery pack 100 may be disposed in the rear portion of the vehicle 1 and may be fixed to the vehicle body frame 10.

The second battery pack 100 may be provided in a smaller size to be coupled to the vehicle body frame 10 through the luggage space 13 which is opened by a tailgate. Furthermore, the second battery pack 100 may not be coupled to the vehicle body frame 10 by a coupling member “F”, but may be coupled through welding.

Meanwhile, the seat space 12 is a space, on which the user is to be seated, and it is necessary to prevent high-temperature gas that flows when a fire occurs in an interior of the second battery pack 100 from being directed to the seat space 12.

To achieve this, the vehicle body frame 10 may define an outlet 14 for venting the high-temperature gas in the interior of the second battery pack 100 to an outside of the vehicle 1. The outlet 14 may be located on a left side and a right side of a rear area of the pack accommodating portion 11. The outlet 14 may be formed on opposite sides of the luggage space 13.

The second battery pack 100 may be coupled to the vehicle body frame 10 through the coupling member “F” that passes through a flange portion 153. The second battery pack 100 may include a guide duct 180 that defines a guide passage 181 (see FIG. 4) that fluidically-communicates the interior of the second battery pack 100 and an outlet 14.

The guide duct 180 may include an opening portion **14*a* which is disposed adjacent to the outlet 14. The opening portion 14*a* may be formed to fluidically-communicate the guide passage 181 and an outside when a pressure of the gas that flows through the guide passage 181** reaches a specific pressure.

Figure 4:
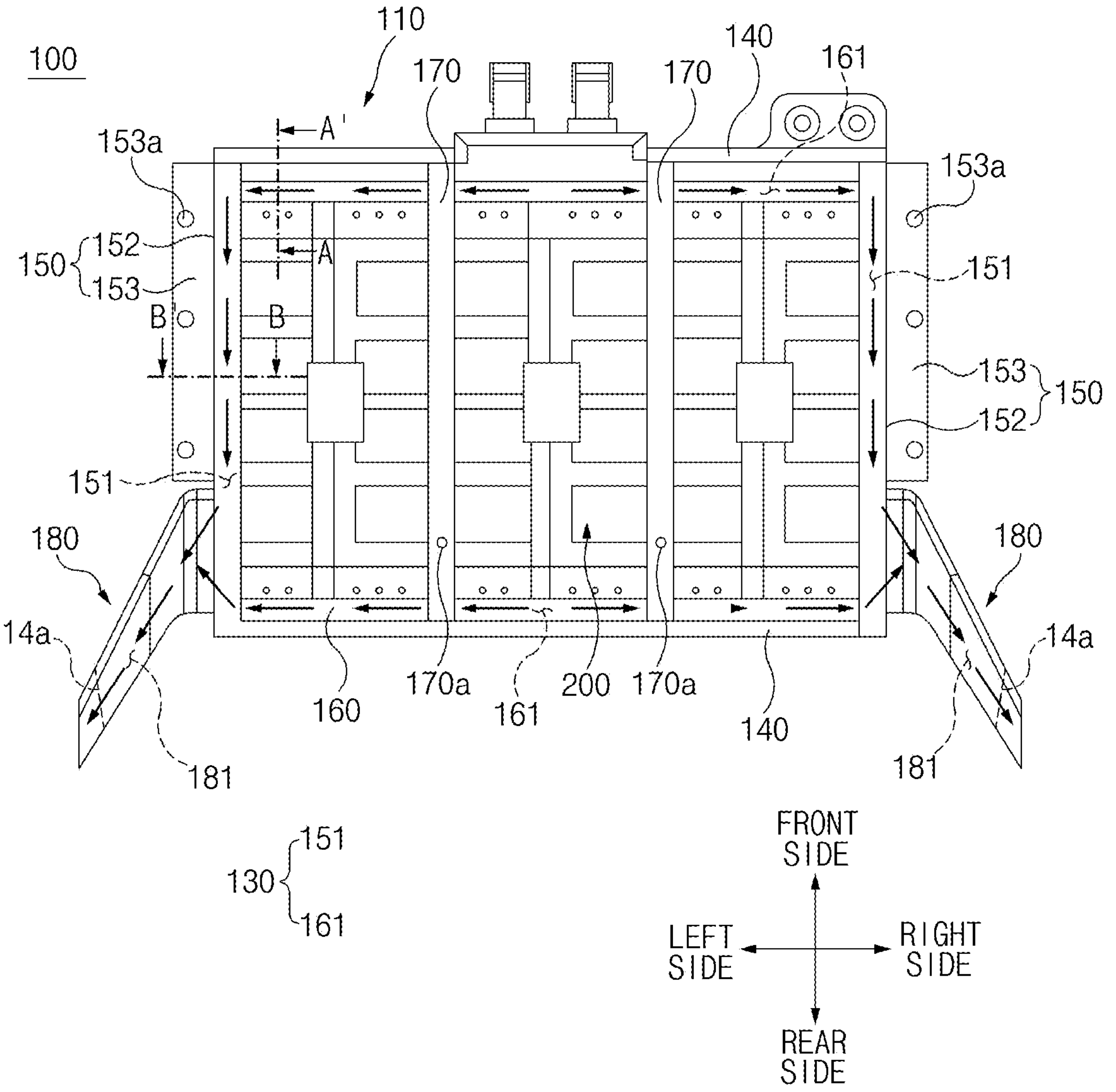
FIG. 4 is a plan view a second battery pack, from which a pack cover is excluded, according to an exemplary embodiment of the present disclosure.

FIG. 4 is a plan view the second battery pack, from which a pack cover is excluded, according to an exemplary embodiment of the present disclosure.

Referring to FIG. 4, the second battery pack 100 may include a plurality of battery modules 200 that extend in a first direction which is a forward/rearward direction and are disposed in a second direction which is a leftward/rightward direction, and a battery pack housing 110 that accommodates the battery modules 200.

The battery pack housing 110 may include a base plate 111 (see FIG. 7) that supports the battery modules 200, and a first side member 140 and a second side member 150 that are coupled to the base plate 111 along a circumference of the base plate 111.

The first side member 140 may be supported by the base plate 111 and extend in the second direction which is the leftward/rightward direction from a front side or a rear side of the battery modules 200.

A pair of first side members 140 may be provided to be coupled to a front circumferential portion and a rear circumferential portion of the base plate 111. The pair of first side members 140 may be disposed in parallel to each other.

The second side member 150 may extend in the forward/rearward direction that crosses the first side member 140 to cover a left side or a rear side of the battery modules 200.

A pair of second side members 150 may be provided to be coupled to a left circumferential portion and a right circumferential portion of the base plate 111. Each of the pair of second side members 150 may include a support portion 152 which is coupled to the base plate 111, and a flange portion 153 that protrudes from the support portion 152 to an outside of the battery pack housing 110.

A flange hole 153*a*, into which the coupling member "F" (see FIG. 3) is to be inserted, may be formed in the flange portion 153. That is, the flange portion 153 may be a component that extends from the support portion 152 to an outside of the battery pack housing 110, and into which the coupling member "F" is to be inserted. In the present way, the battery pack housing 110 may be coupled to the vehicle body frame 10 through the flange portion 153.

The pair of first side members 140 and the pair of second side members 150 may be coupled along the circumference of the base plate 111 to protect the outside of the battery modules 200.

The battery pack housing 110 may include first support members 160 that are disposed between the battery modules 200 and the first side member 140. The first support members 160 may extend in the leftward/rightward direction thereof.

The battery pack housing 110 may include second support members 170 that extend in the forward/rearward direction that crosses the first support member 160 and are disposed between the plurality of battery modules 200. Through-holes 170*a* may be formed in rear areas of the second support members 170.

The first side member 140 may be disposed in parallel to the first support members 160 on an outside of the first support members 160, and the second side member 150 may be connected to the first support members 160.

The second side member 150 or the second support members 170 may press the battery modules 200 to prevent swelling of the battery modules 200 while supporting side of the battery modules 200.

Meanwhile, the battery pack housing 110 may define a venting passage 130 which is configured to vent the high-temperature gas generated from the battery modules 200 to an outside and extends along a circumferential portion of the battery pack housing 110.

The venting passage 130 may include a first venting passage 161 which is formed in an interior of the first support member 160 and extends in the leftward/rightward direction, and a second venting passage 151 which is fluidically-communicating with the first venting passage 161, is formed in an interior of the support portion 152 of the second side member 150, and extends in the forward/rearward direction thereof. The second venting passage 151 may be fluidically-communicating with the first venting passage 161.

The second venting passage 151 may be fluidically-communicating with the guide passage 181. In the present way, the high-temperature gas generated in the battery modules 200 may be vented in the forward/rearward direction of the battery modules 200 and may flow into the first venting passage 161 and the second venting passage 151, and may be vented to the outside of the vehicle body 1 (see FIG. 1) through the outlet 14 (see FIG. 3) on the guide passage 181.

For the present structure, the second battery pack 100 may include a guide duct 180 which is coupled to one side of the battery pack housing 110 to define a guide passage 181 in an interior thereof.

An opening portion 14*a* may be provided on the guide passage 181. The opening portion 14*a* may close the guide passage 181 when the battery modules 200 are normally operated, but when a fire occurs in the battery modules 200 and a pressure of the gas that flows through the guide passage 181 reaches a specific pressure, it may rupture and may fluidically-communicate the guide passage 181 and the outside thereof. The opening portion 14*a* may be provided as a separate venting device or rupture disk.

The guide duct 180 may be coupled to the second side member 150 on a rear side of the flange portion 153. In more detail, the guide duct 180 may be coupled to the support portion 152.

A pair of guide ducts 180 and a pair of outlets 14 (see FIG. 3) may be provided. The pair of guide ducts 180 may be coupled to the pair of second side members 150, respectively, and may extend in a direction that becomes farther away from the second side member 150, respectively. For example, as illustrated in FIG. 4, the guide duct 180 provided on a right side may extend to a right side toward a rear side, and the guide duct 180 provided on a left side may extend to a left side toward the rear side thereof. That is, the pair of guide ducts 180 may extend from the battery pack housing 110 in a direction that becomes farther away from the battery modules 200. Through this, the pair of guide ducts 180 may be coupled to opposite sides of the battery pack housing 110 to fluidically-communicate with the second venting passages 151 and the outlets 14.

Because the outlet 14 is disposed on a rear side of the second side member 150, the guide duct 180 may extend from the second side member 150 to a rear side of the vehicle 1 (see FIG. 1) toward the outlet 14.

The flange portion 153 is provided with a plurality of flange holes 153*a* that are disposed in the forward/rearward direction, and thus, a front portion of the battery pack housing 110 may be stably coupled to the vehicle body frame 10 (see FIG. 3).

On the other hand, a coupling force of the battery pack housing 110 to the vehicle body frame 10 may be relatively weak due to a structure of the guide duct 180 on a rear side of the flange portion 153. To prevent this, the second support members 170 of the battery pack housing 110 may define a through-hole 170*a*, through which the coupling member "F" is to pass, on an area, in which it overlaps the guide duct 180 in the forward/rearward direction thereof.

Through this, because the battery pack housing 110 is fixed to the vehicle body frame 10 through the through-hole 170*a*, a rear portion of the battery pack housing 110 may also be stably supported by the vehicle body frame 10.

Meanwhile, to vent the high-temperature gas through the venting passage 130 described above, a structure for venting the high-temperature gas formed on a side of the battery modules 200 the forward/rearward direction side needs to be provided.

Hereinafter, the structure of the battery modules 200 will be described with reference to FIG. 5 and FIG. 6.

Figure 5:
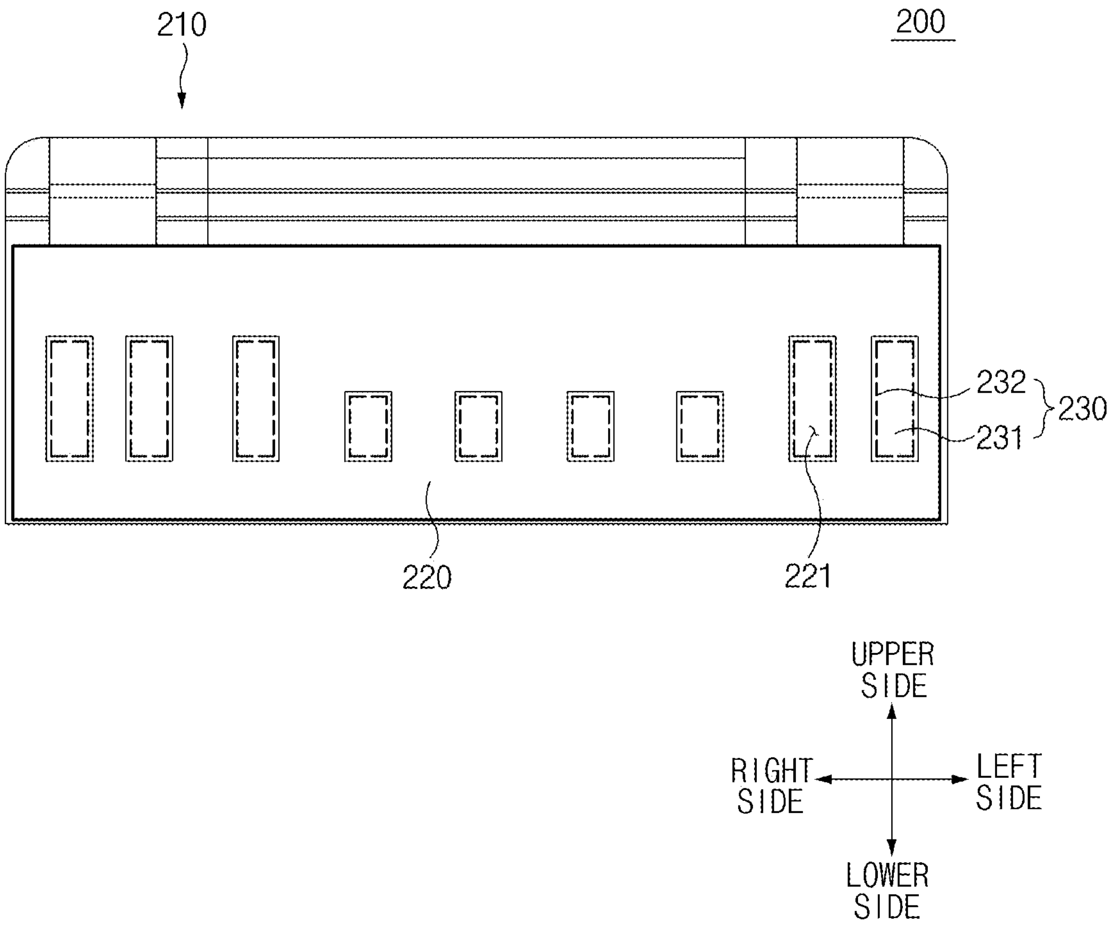
FIG. 5 is a side view of a battery module according to an exemplary embodiment of the present disclosure.

FIG. 5 is a side view of a battery module according to an exemplary embodiment of the present disclosure.

Referring to FIG. 5, a battery module 200 may include a plurality of battery cells 201 (see FIG. 8), and a module housing 210 that covers the plurality of battery cells 201.

The module housing 210 may include a venting frame 220 which is disposed on a front side and a rear side of the battery cells 201. The venting frame 220 may define a plurality of venting holes 221 that are spaced apart from each other in leftward/rightward direction thereof. The venting holes 221 may be holes, through which the high-temperature gas is vent from the battery cell 201 to an outside of the module housing 210.

The battery module 200 may include a side cover 230 which is disposed between the venting frame 220 and the battery cells 201. The side cover 230 may be formed of a fireproof material. A perforated portion 232 which is formed around an area that faces a venting hole 221 may be formed in the side cover 230.

When the battery cell 201 is normally operated, the side cover 230 may cover a front side and a rear side of the battery cell 201. However, when a fire occurs in the battery cell 201, a separation area 231 may be separated from the side cover 230 along the perforated portion 232 due to a pressure of the gas, and thus, an internal space of the module housing 210 and the venting hole 221 are fluidically-communicating with each other whereby the high-temperature gas accommodated in an interior of the module housing 210 may be vented to the front side or the rear side of the module housing 210.

Figure 6:
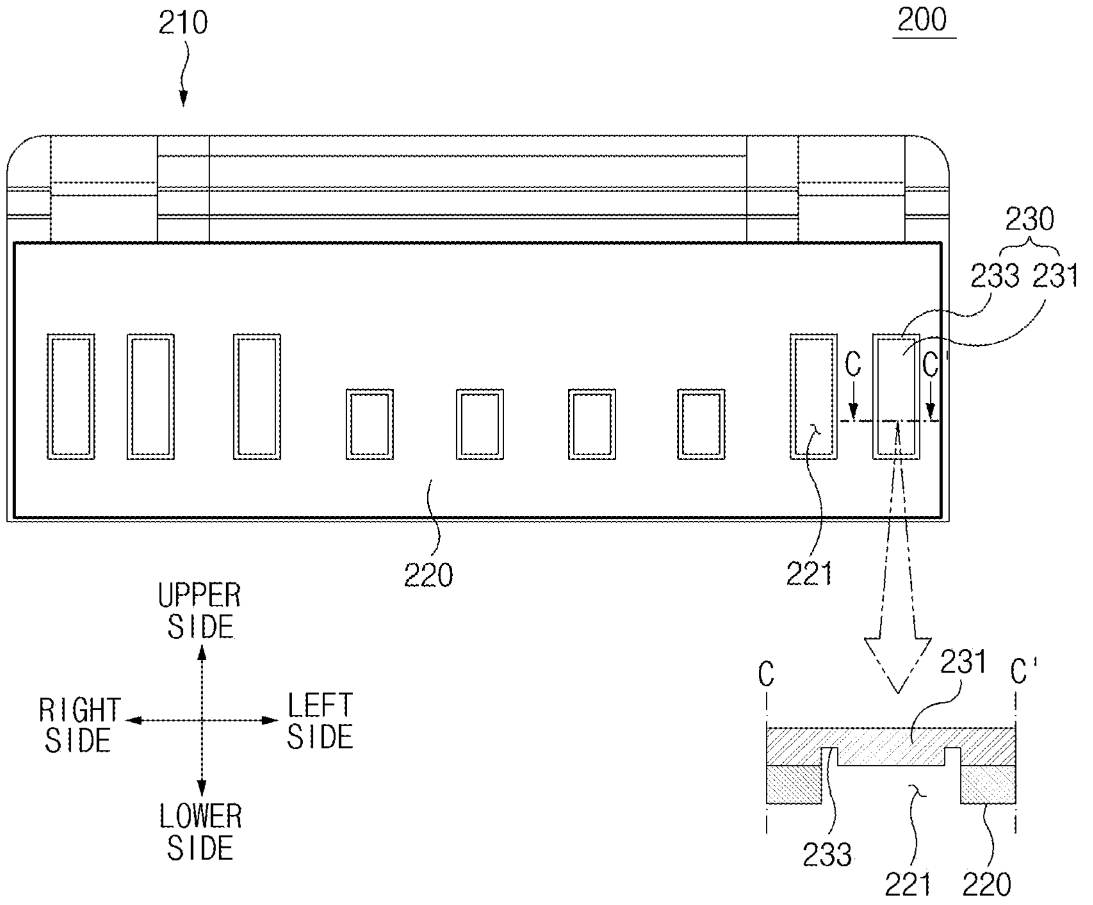
FIG. 6 is a side view of a battery module according to another exemplary embodiment of the present disclosure.

FIG. 6 is a side view of a battery module according to another exemplary embodiment of the present disclosure.

Figure 8:
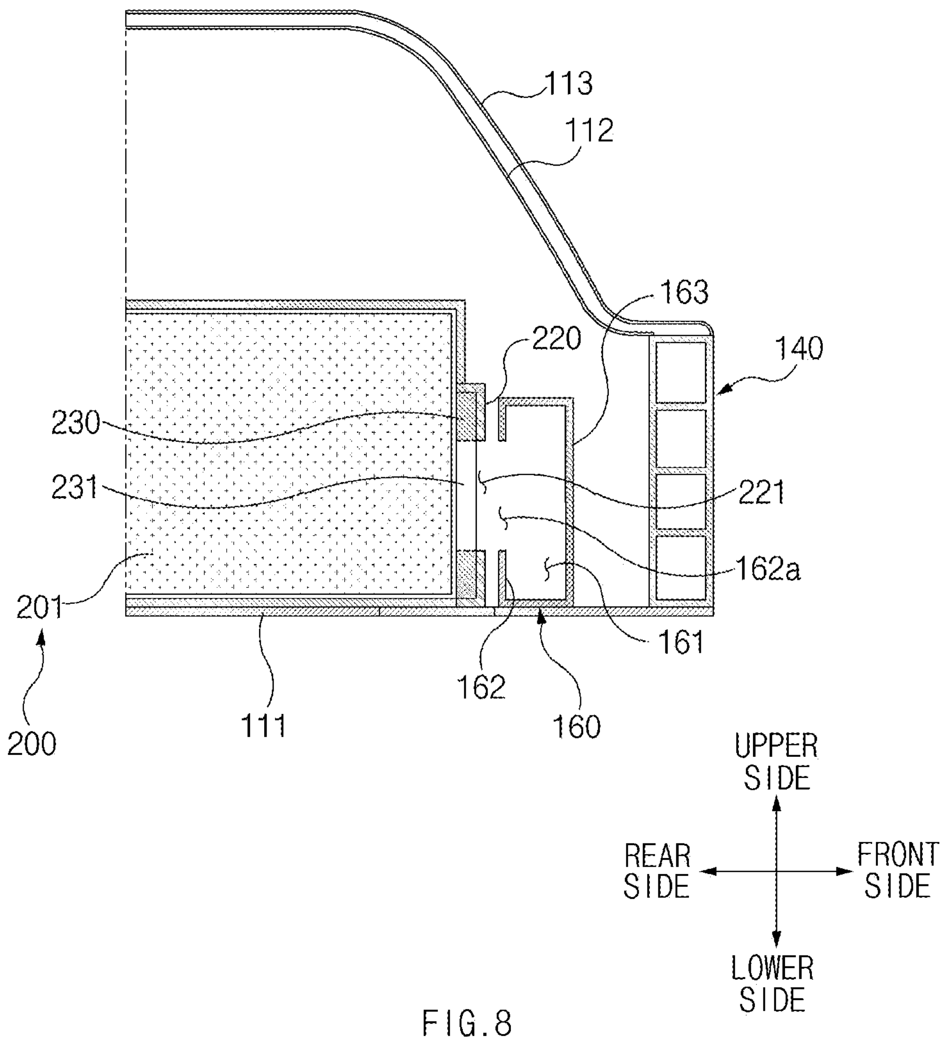
FIG. 8 is a longitudinal cross-sectional view of a battery pack, taken along line A-A' illustrated in FIG. 4.

Referring to FIG. 6, a battery module 200 may include a side cover 230 which is disposed between the venting frame 220 and the battery cells 201 (see FIG. 8). The side cover 230 may be formed of a metal plate.

As illustrated in a transverse cross-sectional view taken along line C-C' in FIG. 6, a notch portion 233 which is formed in an area that faces the venting hole 221 and has a thickness which is smaller than that of a peripheral area may be formed.

Even with the present structure, unlike when the battery cell 201 is normally operated, the separation area 231 may be separated from the side cover 230 along the notch portion 233 due to the pressure of the gas when a fire occurs in the battery cell 201 whereby it may be fluidically-communicating with an internal space of the module housing 210 and the venting hole 221 and thus, the high-temperature gas which is accommodated in the interior of the module housing 210 may be vented to the front side or the rear side of the module housing 210.

For a structure that has not been described in FIG. 6, a description in FIG. 5 will be used.

Hereinafter, a structure for venting the high-temperature gas from the battery module 200 to the outside of the second battery pack 100 will be described.

Figure 7:
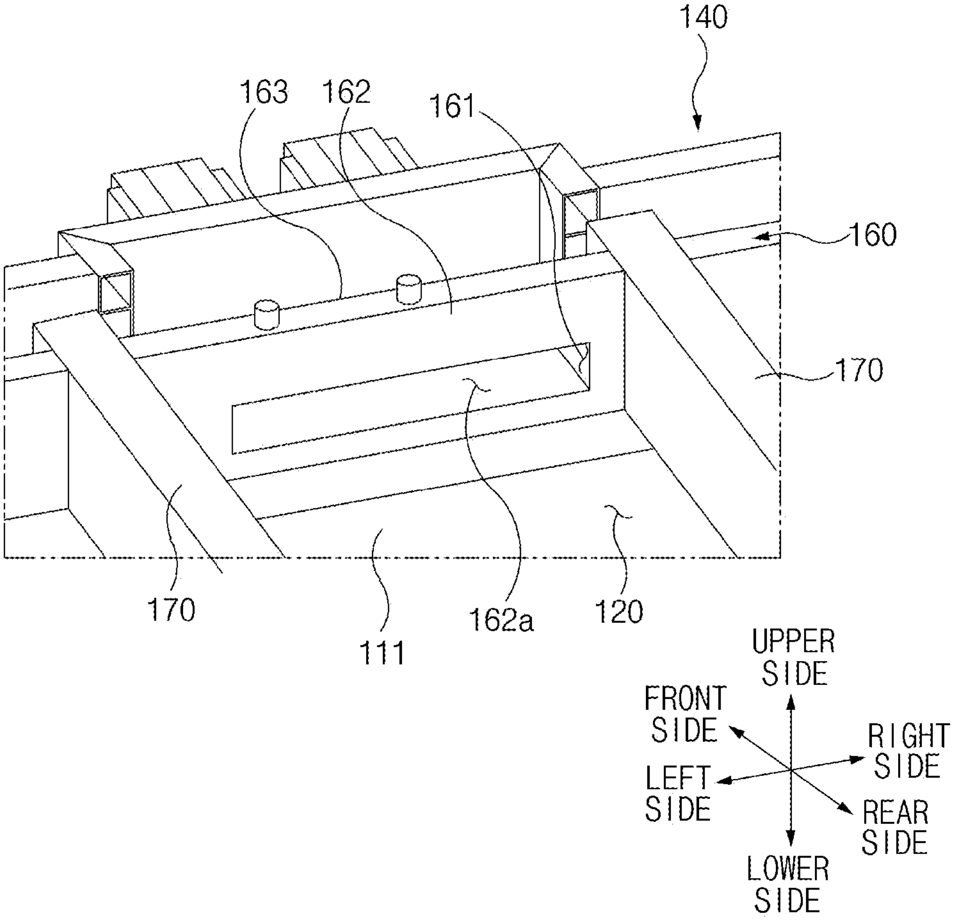
FIG. 7 is a schematic view of a first support member, a second support member, and peripheral components according to an exemplary embodiment of the present disclosure.
Figure 9:
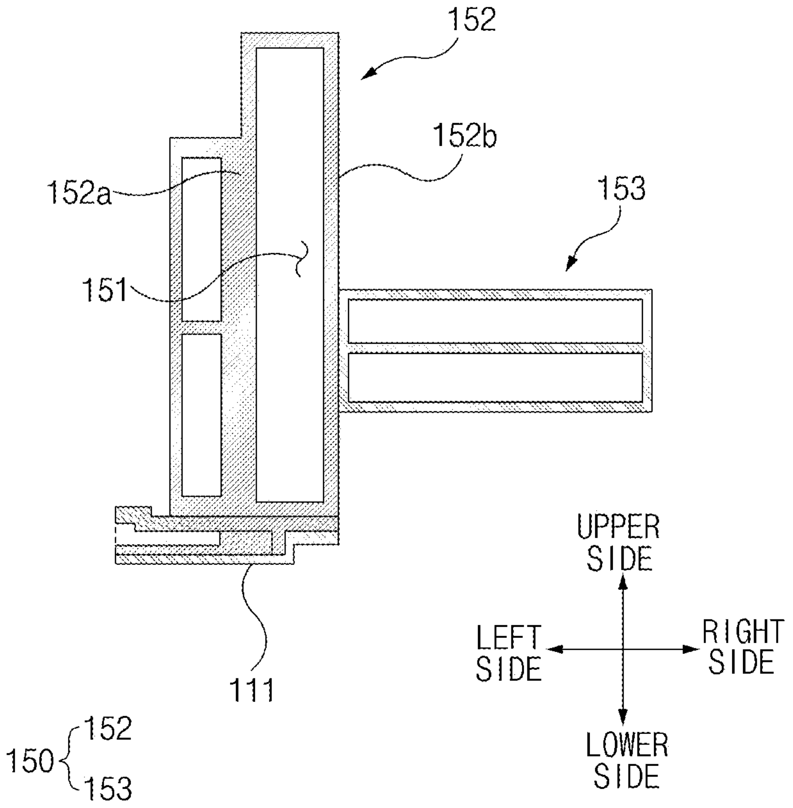
FIG. 9 is a longitudinal cross-sectional view of a second side member, taken along line B-B' illustrated in FIG. 4.

FIG. 7 is a schematic view of the first support member, the second support member, and peripheral components according to an exemplary embodiment of the present disclosure. FIG. 8 is a longitudinal cross-sectional view of the battery pack, taken along line A-A' illustrated in FIG. 4. FIG. 9 is a longitudinal cross-sectional view of the second side member, taken along line B-B' illustrated in FIG. 4.

Referring to FIGS. 4 and 7 to 9, the first support members 160 may include a support external wall 163 that faces the first side member 140, and a support internal wall 162 that faces the module accommodating space 120, in which the battery module 200 is accommodated.

The support internal wall 162 may face the battery module 200, and may define a communication hole **162*a* which is fluidically-communicating with the first venting passage 161 in an area that faces the battery module 200**.

Through this, when a fire occurs in the battery cell 201, the high-temperature gas may be guided to the communication hole **162*a* and the first venting passage 161, which are fluidically-communicating with the venting hole 221, as the separation area 231 is separated from the side cover 230**.

Meanwhile, among the pair of first support members 160, only one first support member 160 which is formed in a front side of the base plate 111 is illustrated in FIG. 7, but a corresponding structure may also be applied to the other first support member 160 which is formed in a rear portion of the base plate 111.

Thereafter, the high-temperature gas may flow through the second venting passage 151 which is formed in an interior of the support portion 152. The support portion 152 may include a side external wall **152*b* that is connected to the flange portion 153, and a side internal wall 152*a* that faces the battery module 200**.

The second venting passage 151 may be formed between the side internal wall **152*a* and the side external wall 152*b* and may extend in the forward/rearward direction of the base plate 111**.

Meanwhile, the support portion 152 may include a shape that protrudes from the side internal wall **152*a* to press the battery module 200**.

Furthermore, the second battery pack 100 may include a pack cover 113 that covers an upper side of the battery module 200. The pack cover 113 may be coupled to the first side member 140 and the second side member 150.

The second battery pack 100 may include a fire-resistant cover 112 which is disposed in an interior of the pack cover 113. Through the present structure, even when a fire occurs in an interior of the second battery pack 100, the pack cover 113 may be prevented from being damaged.

Furthermore, although not illustrated in the drawings, a separate fireproof member may be provided between the first support members 160 and the first side member 140.

Through the above-described structure, the high-temperature gas may be prevented from being vented into the seat space 12 even when a fire occurs in the second battery pack 100 which is mounted on the rear portion of the vehicle 1 (see FIG. 1). Furthermore, the high-temperature gas may be introduced into the guide passage 181 along the venting passage 130 formed in a circumferential portion of the second battery pack 100, and the opening portion **14*a* (see FIG. 2) which is provided on the guide passage 181 may be ruptured so that the high-temperature gas may be vented to the outside of the vehicle 1 through the outlet 14, and thus, a thermal runaway phenomenon may be prevented from occurring in the interior of the second battery pack 100. Furthermore, heat transfer may be prevented from occurring in the interior of the battery module 200** with the same principle.

According to the present technology, with a structure for solving the above-described problems, and a safety of the vehicle may be improved because the fluid generated in the interior of the second battery pack may be vented to the outside of the vehicle rather than to the seat space of the vehicle.

Furthermore, according to the present technology, an airtightness performance of the second battery pack may be maintained when the vehicle is operated normally and the fluid in the interior of the second battery pack may be vented to the outside when a fire occurs in the interior of the second battery pack as well.

Furthermore, various effects that are directly or indirectly recognized through the present disclosure may be provided.

The above description is a simple exemplary description of the technical spirits of the present disclosure, and an ordinary person in the art, to which the present disclosure pertains, may make various corrections and modifications without departing from the essential characteristics of the present disclosure.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A battery pack comprising:

a plurality of battery modules extending in a first direction and disposed in a second direction crossing the first direction;

a battery pack housing accommodating the battery modules, configured to vent fluid to an outside of the battery pack housing, and including a venting passage extending along a circumferential portion of the battery pack housing; and a guide duct coupled to the battery pack housing to define a guide passage fluidically-communicating with the venting passage in an interior of the guide duct, and including an opening portion configured to fluidically-communicate the guide passage and the outside in response that a predetermined pressure is reached in the guide passage, wherein the venting passage includes:

a first venting passage extending in the second direction; and a second venting passage fluidically-communicating with the first venting passage and extending in the first direction, and wherein the battery pack housing further includes:

a first support member extending in the second direction from a side of the battery modules in the first direction or an opposite direction to the first direction, and including the first venting passage in an interior of the first support member;

a first side member disposed on an outside of the first support member to be parallel to the first support member; and a second side member extending in a direction crossing the first side member to cover a side of the battery modules in the second direction or an opposite direction to the second direction, and including the second venting passage in an interior of the second side member, and wherein the guide duct is coupled to the second side member and extends to a side of the battery pack housing.

2. The battery pack of claim 1, wherein the battery pack housing further includes:

a base plate supporting the battery modules, and wherein the first support member is supported by the base plate.

3. The battery pack of claim 1, wherein the first support member includes a communication hole fluidically-communicating with the first venting passage in an area facing the battery modules.

4. The battery pack of claim 3, wherein each of the battery modules includes:

battery cells;

a module housing configured to cover the battery cells, disposed on a side of the battery cells in the first direction or the opposite direction to the first direction, and including a venting frame including a venting hole fluidically-communicating with the communication hole; and a side cover disposed between the venting frame and the battery cells, and including a perforated portion formed along a periphery of an area facing the venting hole or a notch portion formed to have a thickness being smaller than a thickness of a peripheral area thereof.

5. The battery pack of claim 1, wherein the second side member includes:

a support portion including the second venting passage in an interior of the support portion; and a flange portion extending from the support portion to an outside of the battery pack housing and configured so that a coupling member is inserted into the flange portion.

6. The battery pack of claim 5, wherein the guide duct is coupled to the second side member on one side of the flange portion.

7. The battery pack of claim 1, wherein the guide duct extends from the battery pack housing in a direction being more distant from the battery modules.

8. The battery pack of claim 1, wherein the battery pack housing further includes:

a second support member extending a direction crossing the first support member, and including a through-hole, through which a coupling member passes, on an area overlapping the guide duct in the first direction.

9. The battery pack of claim 1, wherein the first support members includes:

a support external wall that faces the first side member; and a support internal wall that faces the battery modules;

wherein the support internal wall includes a communication hole which is fluidically-communicating with the first venting passage in an area that faces the battery modules, and wherein the communication hole is disposed to face a separation area of a side cover covering the battery modules, and wherein the separation area of the side cover is separated from the side cover in response that the predetermined pressure is reached in the separation area of the side cover.

10. The battery pack of claim 1, further including:

a pack cover coupled to the first side member and the second side member to cover an upper side of the battery modules; and a fire-resistant cover disposed on an inside of the pack cover.

11. A vehicle comprising:

a vehicle body frame defining a pack accommodating portion provided in a rear portion of the vehicle, and defining an outlet formed on one side of the pack accommodating portion in a leftward and rightward direction thereof; and the battery pack of claim 1 mounted in the pack accommodating portion.

12. The vehicle of claim 11, wherein the battery pack housing includes a base plate, and wherein the first support member is supported by the base plate, covering a side of the battery module in the first direction.

13. The vehicle of claim 11, wherein the second side member includes:

a support portion including the second venting passage; and a flange portion protruding from the support portion to an outside of the battery pack housing, and coupled to the vehicle body frame, and wherein the guide duct is coupled to the second side member on a rear side of the flange portion.

14. The vehicle of claim 12, wherein the outlet is disposed on a rear side of the second side member, and wherein the guide duct extends to a rear side of the vehicle from the second side member toward the outlet.

15. The vehicle of claim 14, wherein the vehicle body frame includes a seat space provided on a front side of the pack accommodating portion, and a luggage space provided on a rear side or an upper side of the pack accommodating portion, and wherein the outlet is formed on one side of the luggage space.

16. The vehicle of claim 11, wherein the battery pack housing further includes:

a second support member extending in a direction crossing the first support member, and including a through-hole, through which a coupling member passes, on an area overlapping the guide duct in the first direction.

17. The vehicle of claim 11, wherein each battery module includes:

battery cells;

a module housing configured to cover the battery cells, disposed on a side of the battery cells in the first direction or an opposite direction to the first direction, and including a venting frame including a venting hole fluidically-communicating with a communication hole, wherein the first support member includes the communication hole fluidically-communicating with the first venting passage; and a side cover disposed between the venting frame and the battery cells, and including a separation area, wherein the separation area of the side cover is separated from the side cover in response that the predetermined pressure is reached in the in the separation area of the side cover.

18. The vehicle of claim 17, wherein the separation area of the side cover includes a perforated portion formed along a periphery of an area facing the venting hole or a notch portion formed to have a thickness being smaller than a thickness of a peripheral area thereof.

* * * * *